United States Patent
Huang

(10) Patent No.: US 6,309,155 B1
(45) Date of Patent: Oct. 30, 2001

(54) EXPANDING SLEEVE ANCHOR USED IN A CONCRETE WALL AND STRUCTURE FOR ENHANCING THE ANCHORING CAPABILITY THEREOF

(75) Inventor: Pan Ching Huang, Hsien Hsi Hsiang (TW)

(73) Assignee: Joker Industrial Co., Ltd., Hsien Hsi Hsiang (TW)

( * ) Notice: Subject to any disclaimer, the term of this patent is extended or adjusted under 35 U.S.C. 154(b) by 0 days.

(21) Appl. No.: 09/606,216

(22) Filed: Jun. 29, 2000

(51) Int. Cl.[7] .................................................. F16B 13/06
(52) U.S. Cl. .............................. 411/61; 411/55; 411/60.2
(58) Field of Search ................................ 411/34, 36, 55, 411/60.1, 60.2, 61

(56) References Cited

U.S. PATENT DOCUMENTS 1,293,844 * 2/1919 Malaby .................................... 411/36
4,692,076 * 9/1987 Herb ....................................... 411/55
4,720,224 * 1/1988 Peterken .............................. 411/55 X

FOREIGN PATENT DOCUMENTS

1525127 * 4/1968 (FR) ....................................... 411/36

* cited by examiner

Primary Examiner—Neill Wilson
(74) Attorney, Agent, or Firm—Rosenberg, Klein & Lee

(57) ABSTRACT

An expanding sleeve anchor structure includes a nail base tube cooperating with a tapered spreading member. The nail base tube has an upper section provided with a plurality of separating lines each having an elongated transverse hollow slot substantially centered thereon which is used for reducing the stress concentration of the upper section of the nail base tube when the upper section of the nail base tube is forced to expand outward resulting in complete expansion.

3 Claims, 12 Drawing Sheets

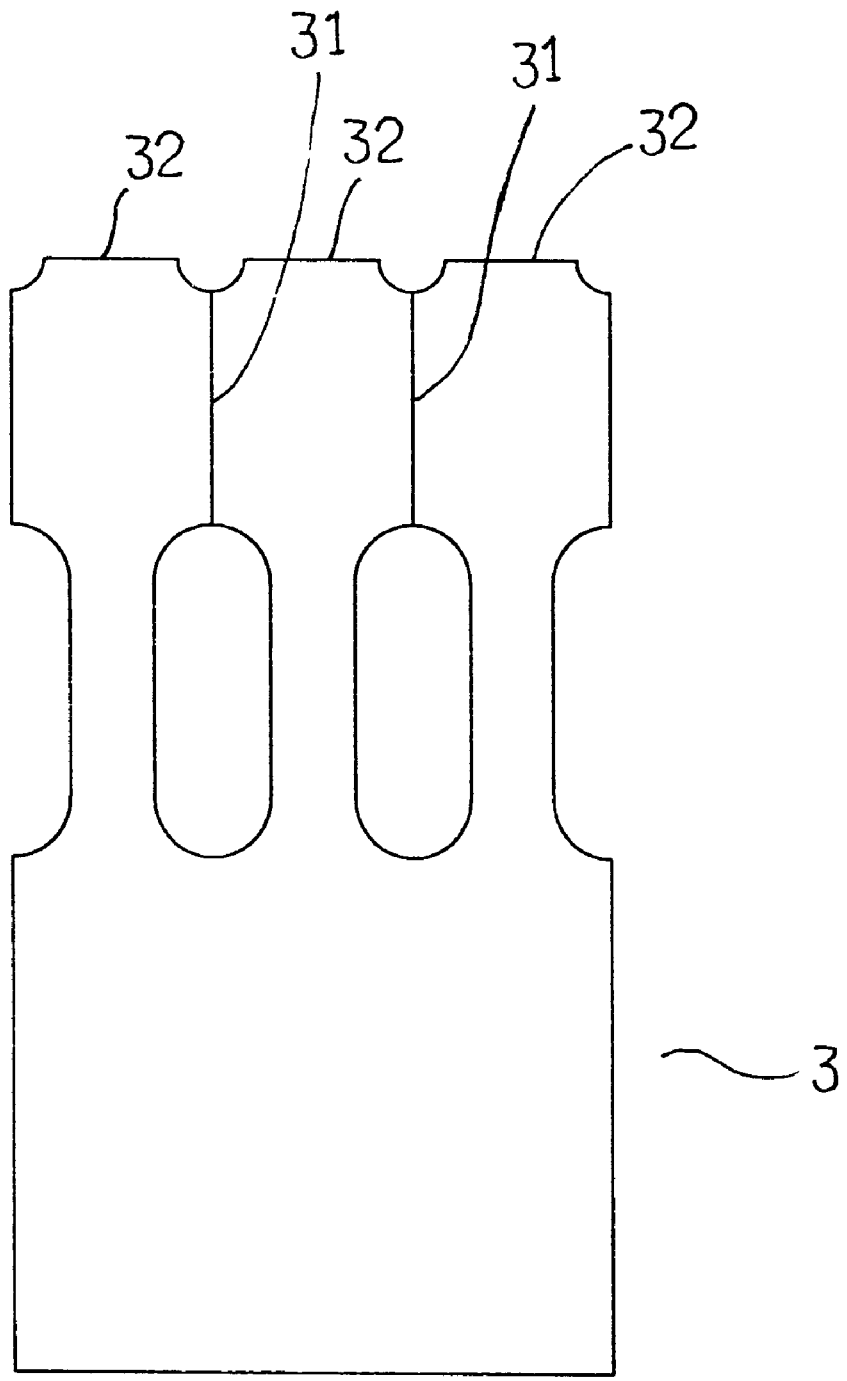
F I G. 5

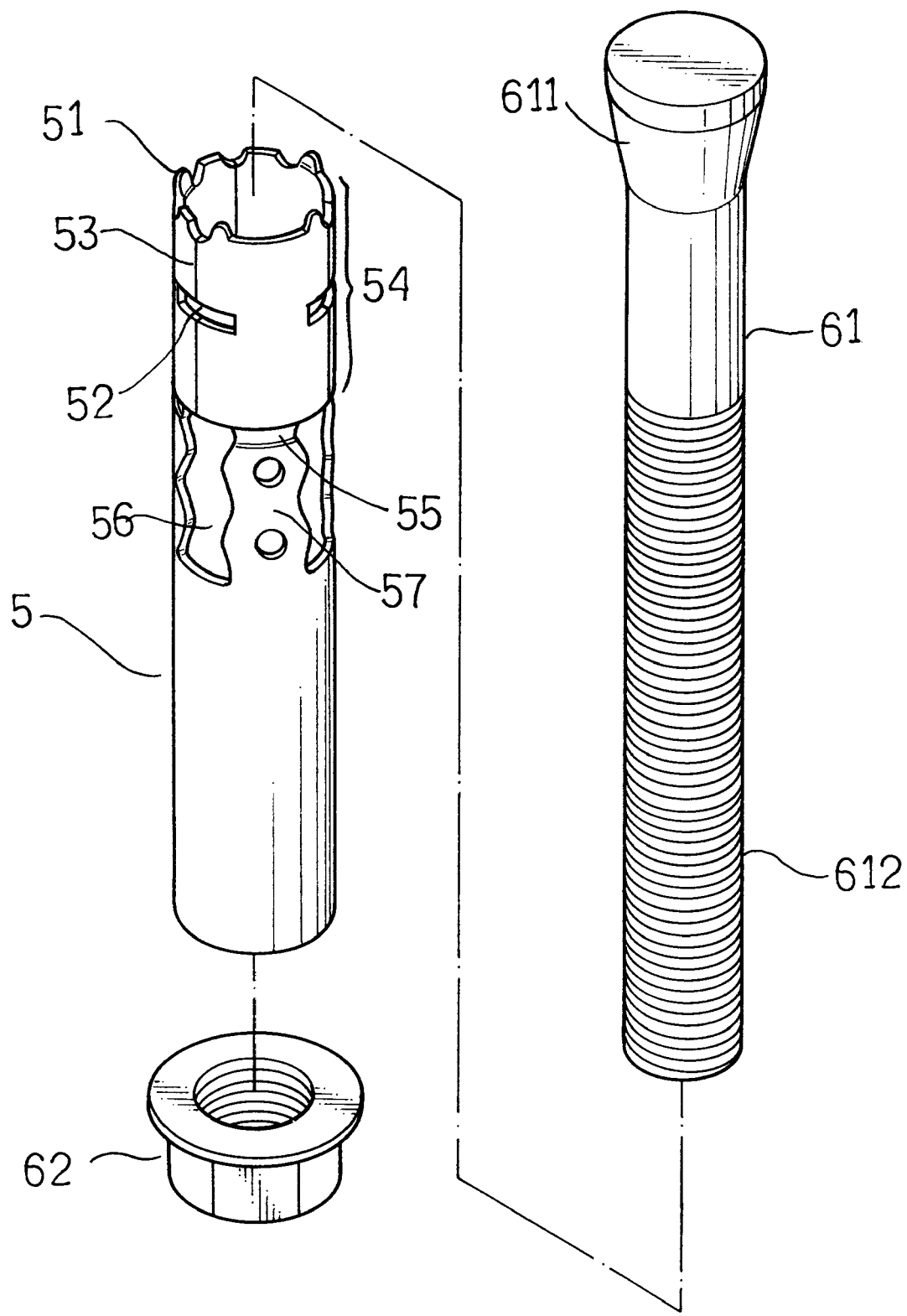
F I G. 6

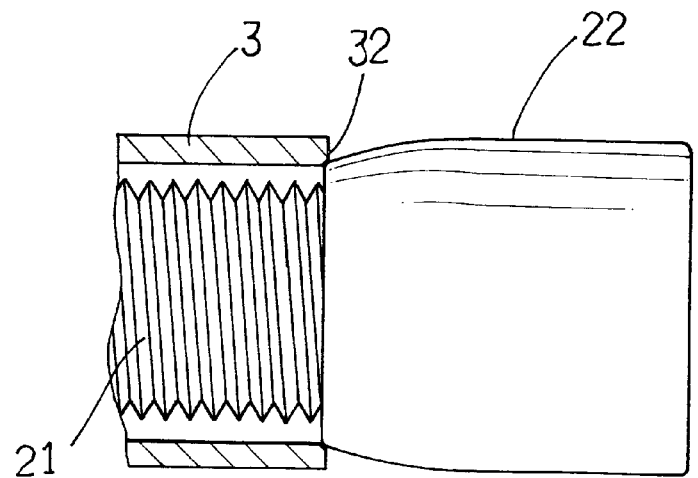
F I G. 21
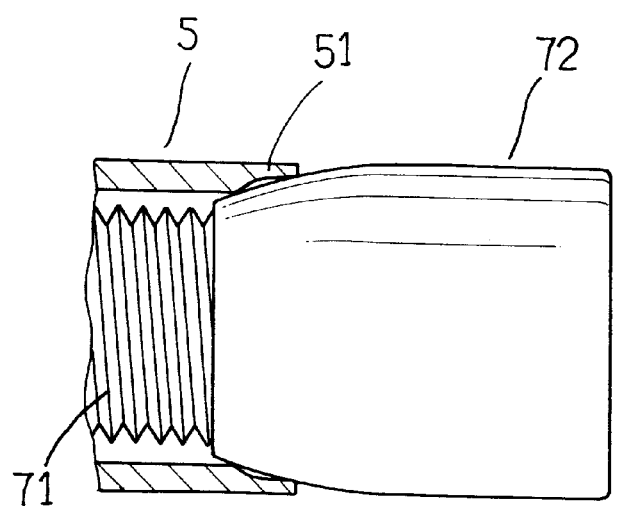
F I G. 22

EXPANDING SLEEVE ANCHOR USED IN A CONCRETE WALL AND STRUCTURE FOR ENHANCING THE ANCHORING CAPABILITY THEREOF

BACKGROUND OF THE INVENTION

1. Field of the Invention

The present invention relates to an expanding sleeve anchor used in a concrete wall and a structure for enhancing the anchoring capability thereof.

2. Description of the Related Art

A first conventional expanding sleeve anchor structure used in a concrete wall in accordance with the prior art is shown in FIGS. 1 and 2. The expanding sleeve anchor structure comprises a nail base tube 3 provided with a plurality of separating lines 31 and an urging bolt 11 fitted with a tapered head 111, extending through the nail base tube 3. When the expanding sleeve anchor is inserted into cavity 41 of concrete wall 4, tapered head 111 is pressed into the nail base tube 3, and the separating lines 31 are urged outward, thereby securing the nail base tube 3 in the cavity 41 of the concrete wall 4.

A second conventional expanding sleeve anchor structure used in a concrete wall in accordance with the prior art is shown in FIGS. 3 and 4. The expanding sleeve anchor structure comprises a nail base tube 3 inserted into a cavity 41 of the concrete wall 4 and provided with a plurality of separating lines 31, a bolt 21 extending through the nail base tube 3, and an urging nut 22 screwed on the bolt 21 to be pressed into the nail base tube 3 for urging the separating lines 31 outward, thereby securing the nail base tube 3 in the cavity 41 of the concrete wall 4.

As shown in FIG. 5, the conventional nail base tube 3 includes a plurality of front end guide inlets 32 for allowing entrance of the tapered head 111 of the urging bolt 11 as shown in FIG. 2 or the urging nut 22 as shown in FIG. 4 into the nail base tube 3. However, the front end guide inlets 32 of the conventional nail base tube 3 have a large forging face so that the tapered head 111 of the urging bolt 11 or the urging nut 22 is not easily pressed into the conventional nail base tube 3 through the front end guide inlets 32.

SUMMARY OF THE INVENTION

In accordance with one aspect of the present invention, there is provided an expanding sleeve anchor structure used in a concrete wall for enhancing the anchoring capability thereof and comprising a nail base tube cooperating with an urging member, the improvement comprising: the nail base tube having an upper section provided with a plurality of separating lines each having an elongated transverse hollow slot substantially centered thereon which is used for reducing stress concentration in the upper section of the nail base tube when the upper section of the nail base tube is forced to expand outward.

Preferably, the hollow slot has one end provided with a notch, extending upward or downward, and an outward folding region defined between the expanding section and the separating line whereby the outward folding region can be forced into a wall of a cavity of a concrete wall, thereby enhancing the anchoring capability of the expanding sleeve anchor structure.

Preferably, the nail base tube has a front end provided with at least two equally spaced inlet tabs.

Further benefits and advantages of the present invention will become apparent after a careful reading of the detailed description with appropriate reference to the accompanying drawings.

BRIEF DESCRIPTION OF THE DRAWINGS

FIG. 5 is a front plan view of a nail base tube of the conventional expanding sleeve anchor structure in accordance with the prior art;

FIG. 6 is an exploded view of an expanding sleeve anchor structure used in a concrete wall in accordance with a first embodiment of the present invention;

FIG. 21 is a front plan cross-sectional view of the conventional expanding sleeve anchor structure in accordance with the prior art; and FIG. 22 is a front plan cross-sectional view of the expanding sleeve anchor structure in accordance with the present invention.

DETAILED DESCRIPTION OF THE INVENTION

Figure 1:
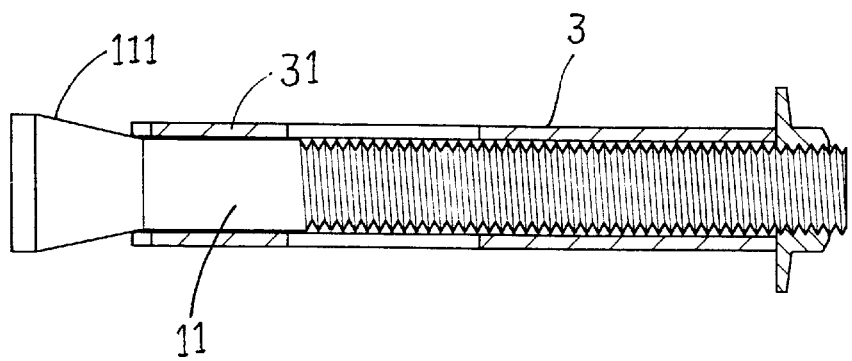
FIG. 1 is a front plan cross-sectional view of a first conventional expanding sleeve anchor structure used in a concrete wall in accordance with the prior art.
Figure 2:
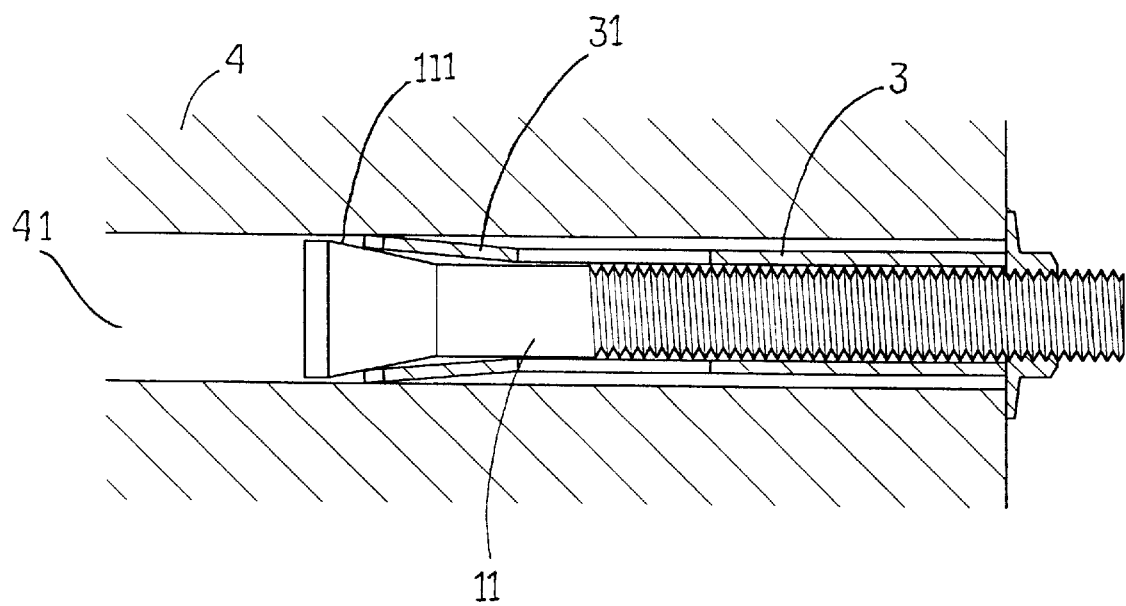
FIG. 2 is an operational view of the first conventional expanding sleeve anchor structure as shown in Fig. 1.
Figure 3:
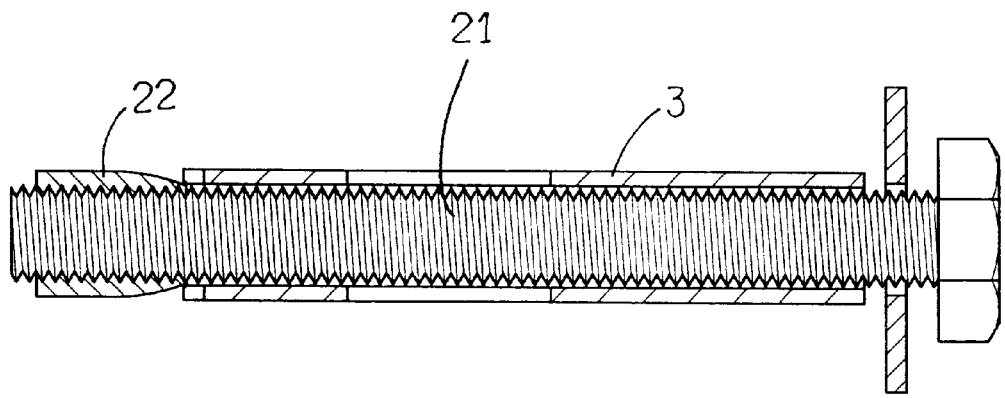
FIG. 3 is a front plan cross-sectional view of a second conventional expanding sleeve anchor structure used in a concrete wall in accordance with the prior art.
Figure 4:
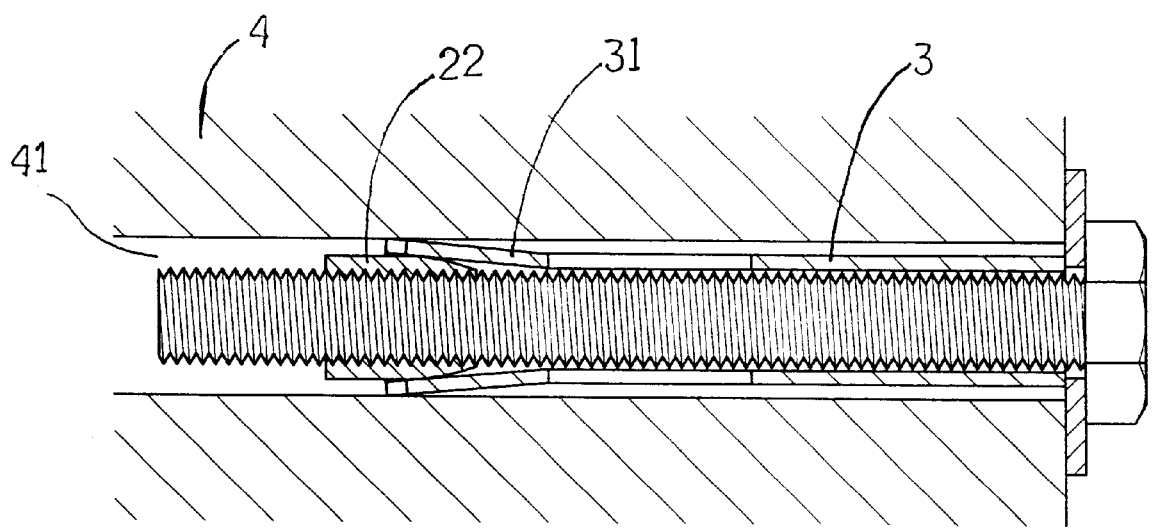
FIG. 4 is an operational view of the second conventional expanding sleeve anchor structure as shown in FIG. 3.

Referring now to the drawings and initially to FIGS. 6 and 8–10, an expanding sleeve anchor structure in accordance with the present invention comprises a nail base tube 5 cooperating with an urging bolt 61 and a nut 62. The urging bolt 61 includes a tapered head 611 and an outer thread 612.

The nail base tube 5 includes an upper section 54 provided with a plurality of separating lines 53 each having an elongated transverse hollow slot 52 substantially centered thereon which is used for reducing the stress concentration in the upper section 54 of the nail base tube 5 when the upper section 54 of the nail base tube 5 is pressed to expand outward.

The nail base tube 5 has a front end provided with a plurality of equally spaced inlet edges 51. Each of the separating lines 53 of the nail base tube 5 includes a lower end located adjacent to a longitudinal hole 56. A longitudinal rib 57 is formed between two adjacent longitudinal holes 56. A recessed rib 55 is provided on the joint between the longitudinal rib 57 and the upper section 54 of the nail base tube 5.

Figure 9:
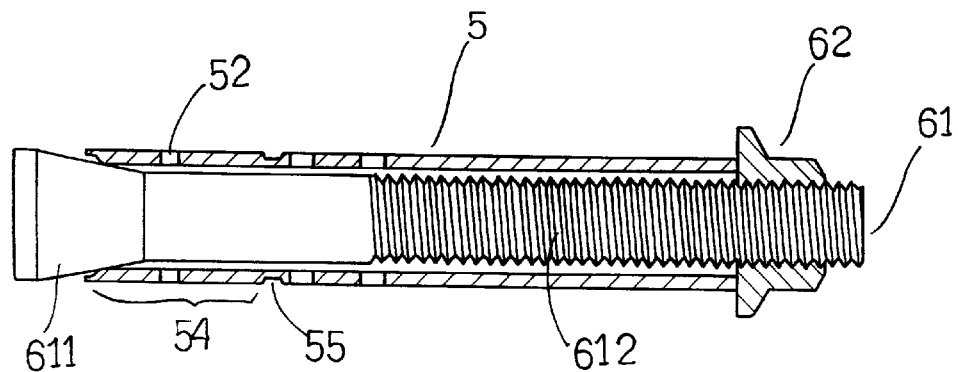
FIG. 9 is a front plan cross-sectional assembly view of the expanding sleeve anchor structure as shown in FIG. 6.
Figure 10:
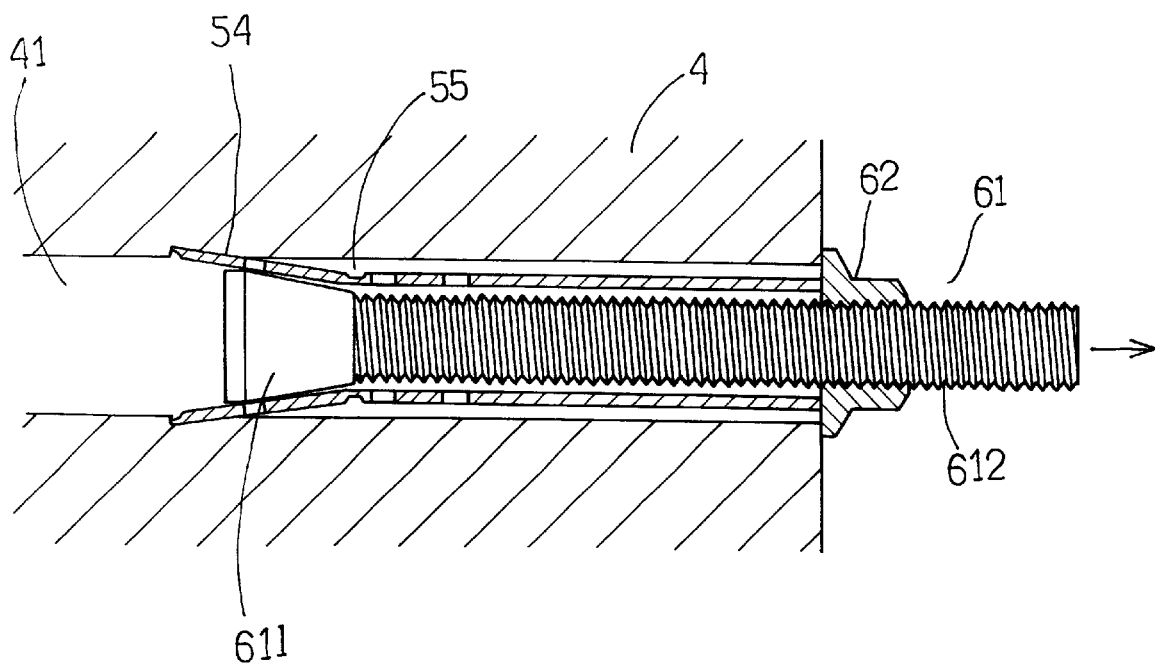
FIG. 10 is an operational view of the expanding sleeve anchor structure as shown in FIG. 9.

In operation, the nut 62 is positioned at one end of the nail base tube 5, and the urging bolt 61 extends through the nail base tube 5 and is screwed into the nut 62 as shown in FIG. 9. The nail base tube 5 is then inserted into the cavity 41 of the concrete wall 4 with the nut 62 abutting the wall 4 as shown in Fig. 10. The urging bolt 61 is drawn into the upper section 54 of the nail base tube 5 to urge the upper section 54 of the nail base tube 5 outward against the inner wall of the cavity 41 of the concrete wall 4.

The elongated transverse hollow slot 52 can be used for reducing the stress concentration of the upper section 54 of the nail base tube 5, and the recessed ribs 55 can be used for limiting the expanding regions to a desired extent. By means of the design of the hollow slots 52, the tapered head 611 of the urging bolt 61 can be easily pressed into the nail base tube 5, thereby efficiently achieving complete expansion.

Figure 7:
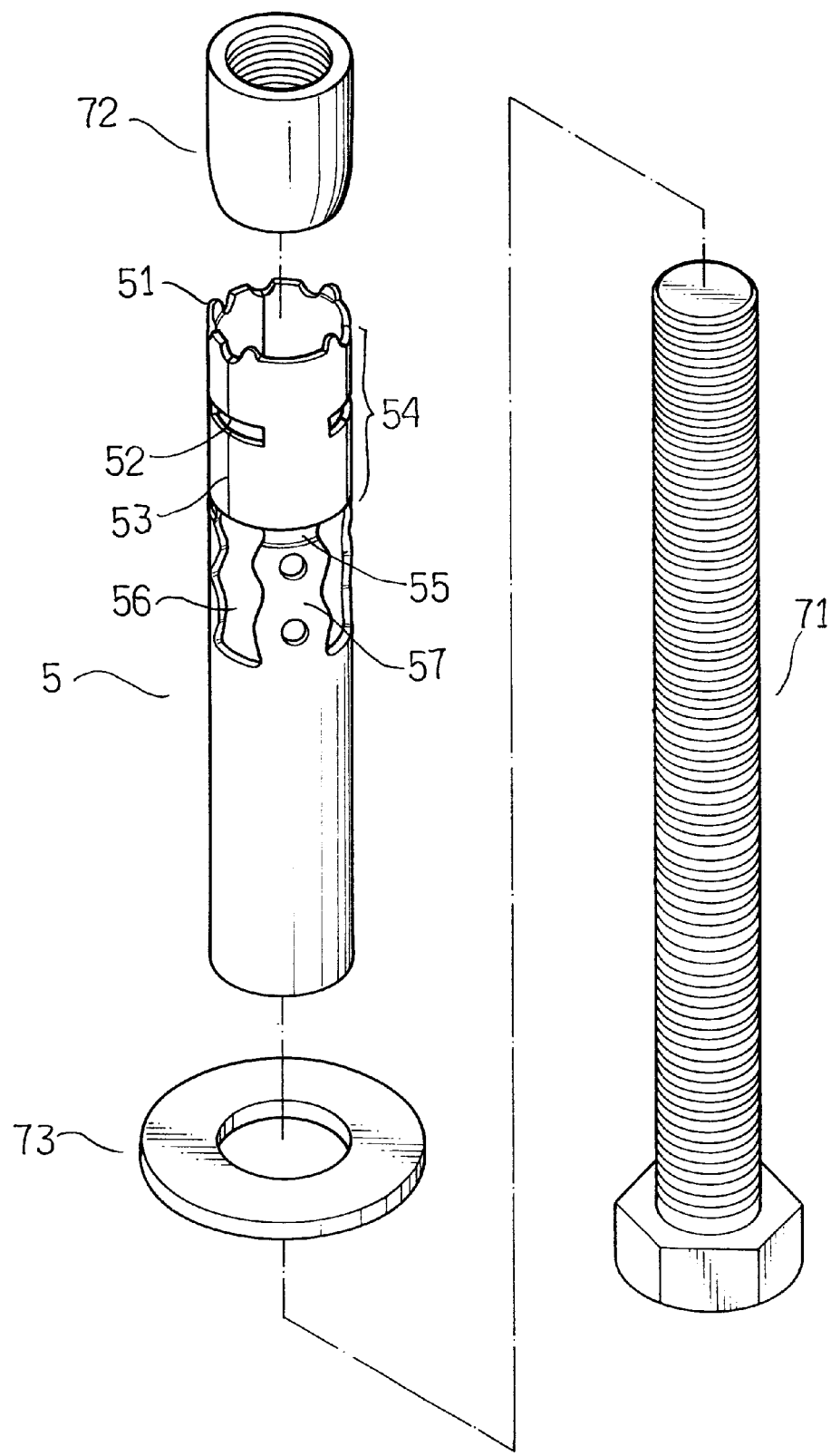
FIG. 7 is an exploded view of an expanding sleeve anchor structure used in a concrete wall in accordance with a second embodiment of the present invention.
Figure 8:
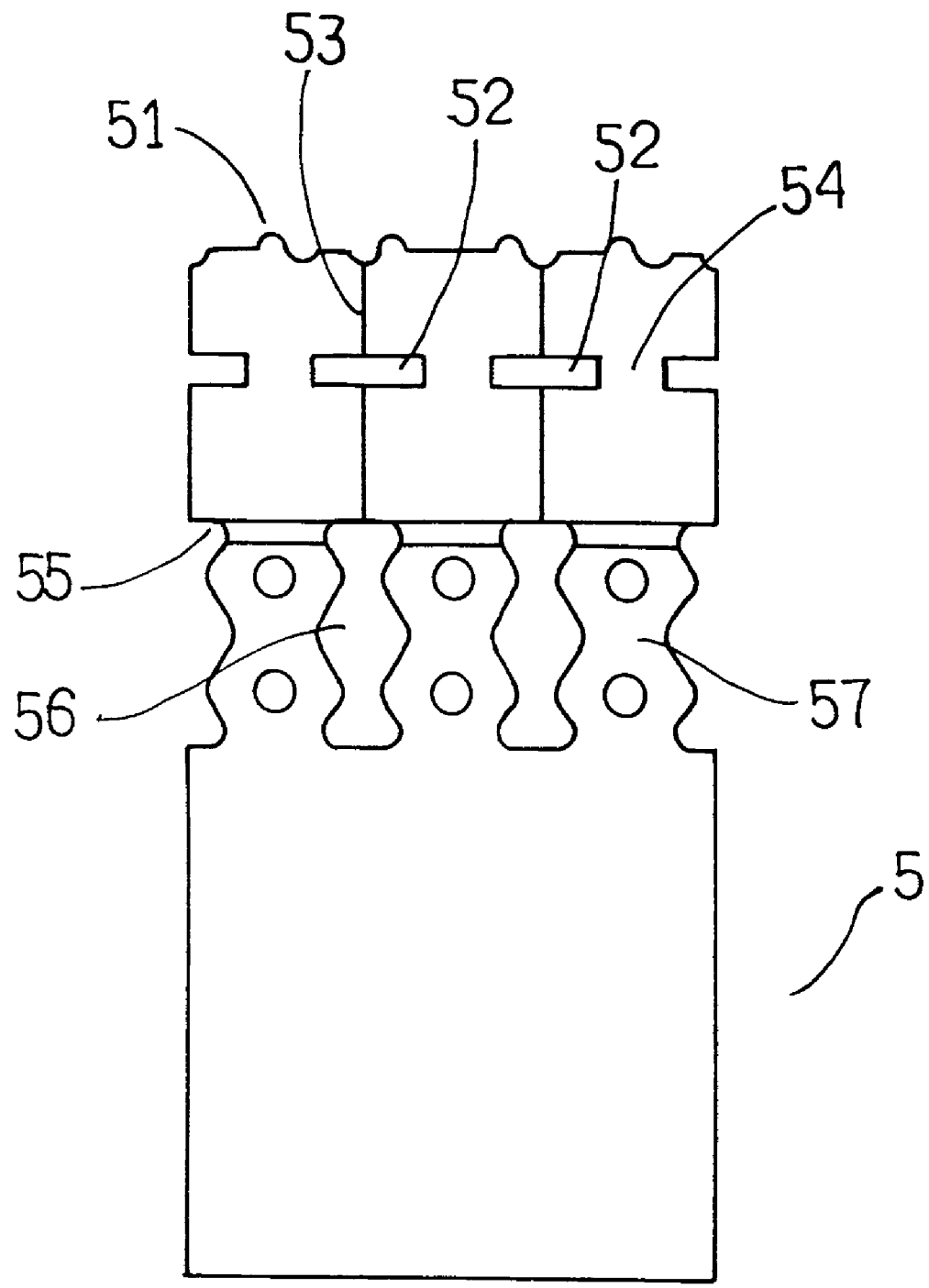
FIG. 8 is a front plan view of a nail base tube of the expanding sleeve anchor structure in accordance with the present invention.
Figure 11:
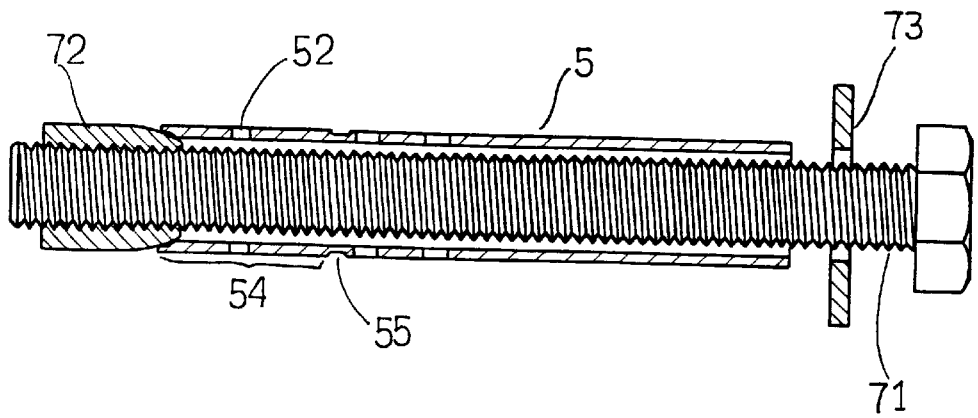
FIG. 11 is a front plan cross-sectional assembly view of the expanding sleeve anchor structure as shown in FIG. 7.
Figure 12:
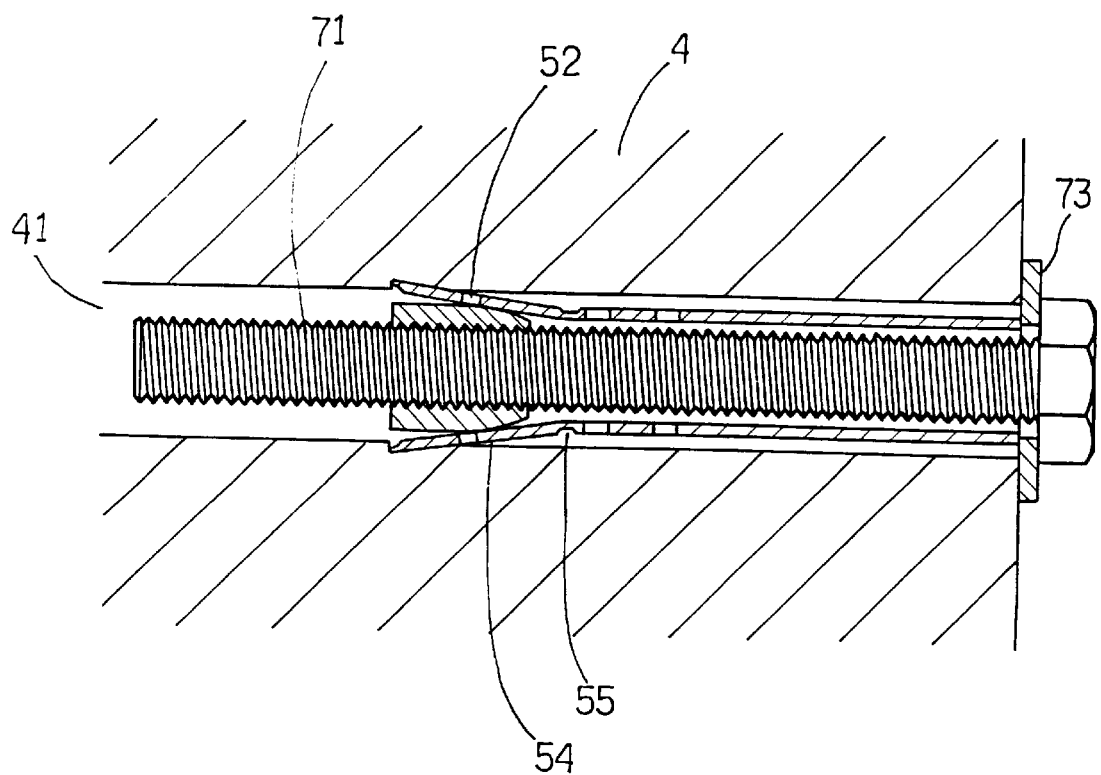
FIG. 12 is an operational view of the expanding sleeve anchor structure as shown in FIG. 11.

Referring now to FIGS. 11 and 12 with reference to FIGS. 7 and 8, in accordance with another embodiment of the present invention, the expanding sleeve anchor structure used in a concrete wall for enhancing the expanding effect thereof comprises the nail base tube 5 cooperating with a bolt 71, an urging nut 72, and a washer 73. The operation of the expanding sleeve anchor structure is similar to that of the first embodiment as shown in FIGS. 9 and 10, and will not be further described in detail.

Figure 13:
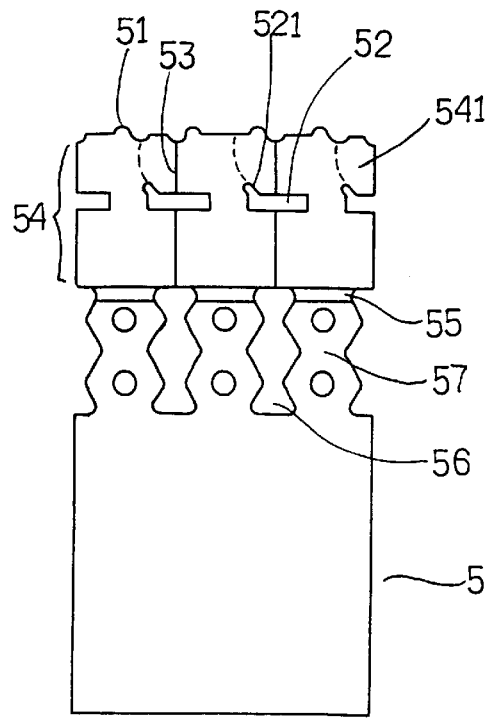
FIG. 13 is a front plan view of a nail base tube expanding sleeve anchor structure in accordance with a further embodiment of the present invention.
Figure 14:
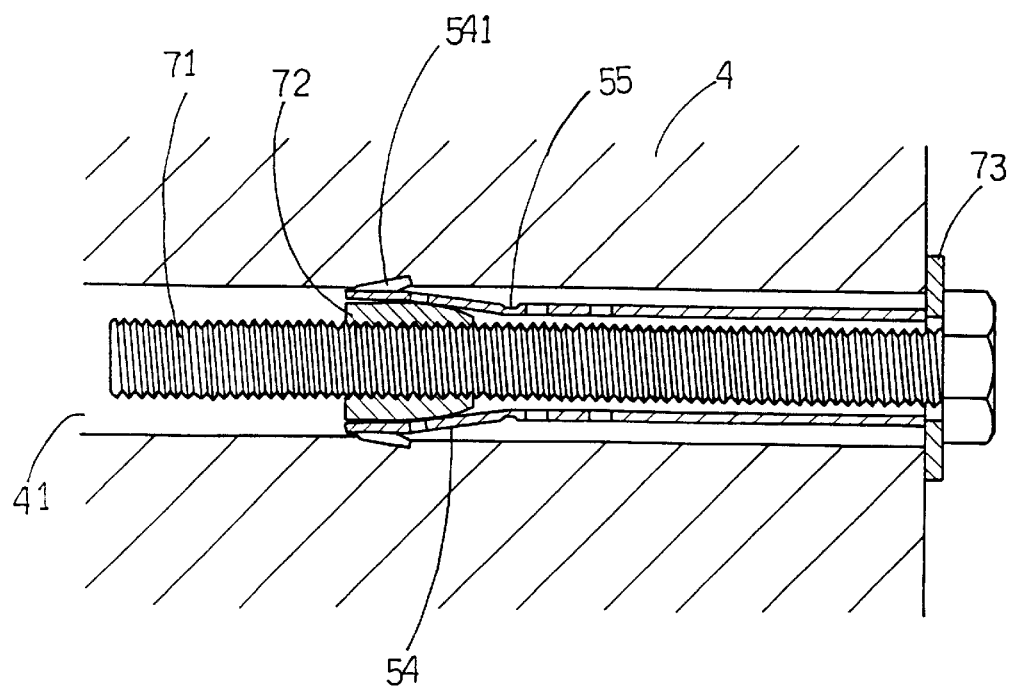
FIG. 14 is a front plan cross-sectional assembly view of the expanding sleeve anchor structure as shown in FIG. 13.
Figure 15:
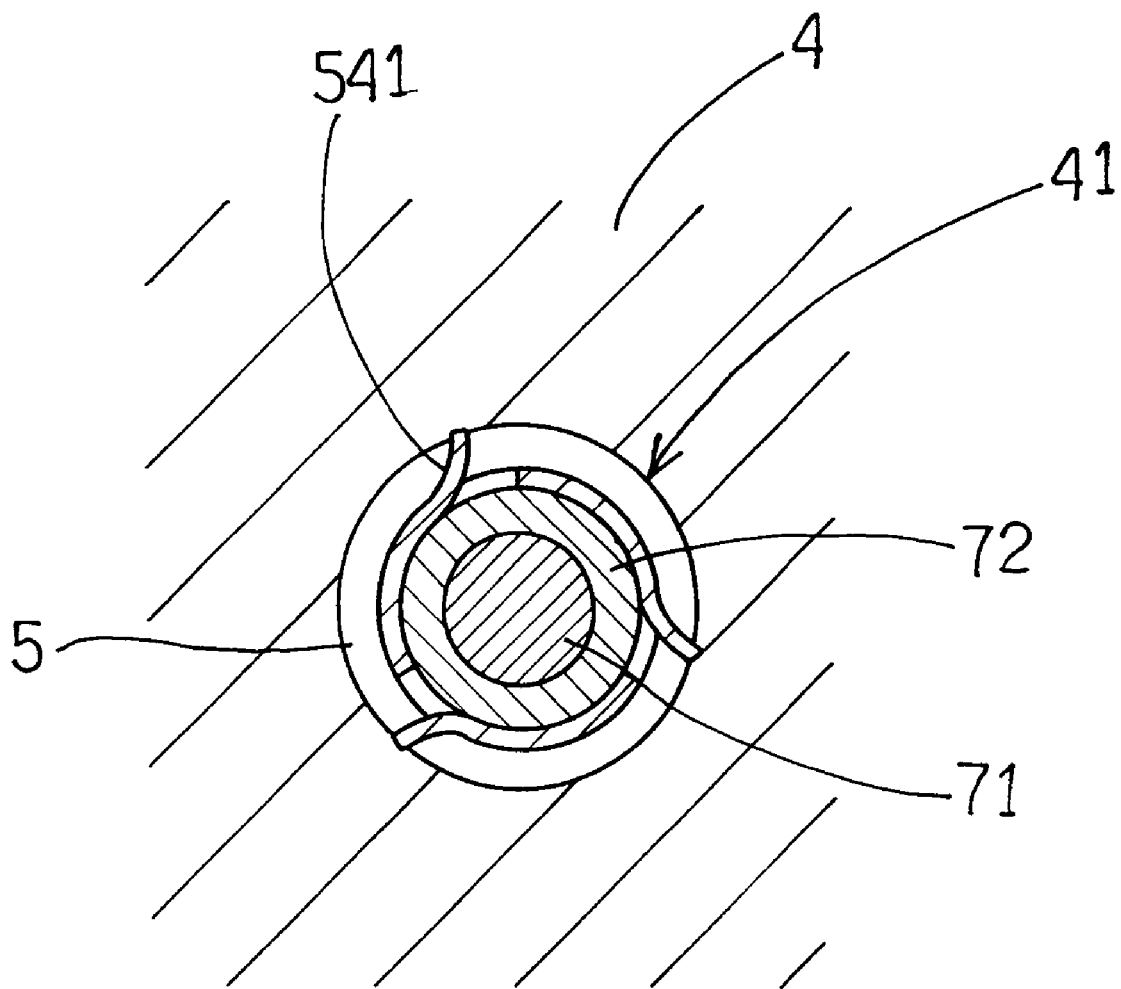
FIG. 15 is a side plan cross-sectional assembly view of the expanding sleeve anchor structure as shown in FIG. 14.

Referring to FIGS. 13–15, in accordance with a further embodiment of the present invention, the hollow slot 52 has a left end provided with a notch 521 extending upward so that an outward folding region 541 is defined between the notch 521 and the separating line 53.

When the nail base tube 5 is under compression, the outward folding region 541 defined between the notch 521 and the separating line 53 is folded outward whereby the outward folding region 541 is forced into the wall of the cavity 41 of the concrete wall 4 thereby enhancing the anchoring capability of the expanding sleeve anchor.

Figure 16:
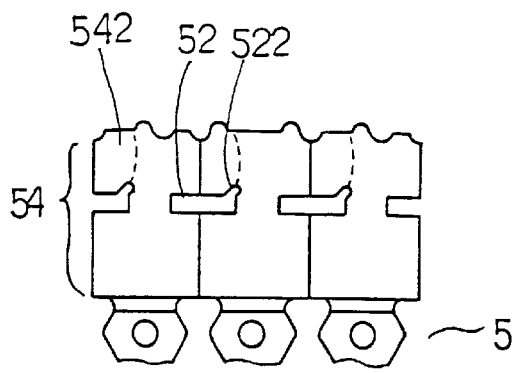
FIG. 16 is a front plan view of a nail base tube of the expanding sleeve anchor structure in accordance with a further embodiment of the present invention.

Referring now to FIG. 16, in accordance with a further embodiment of the present invention, the hollow slot 52 has a right end provided with a notch 522 extending upward so that an outward folding region 542 is defined between the notch 522 and the separating line 53.

Figure 17:
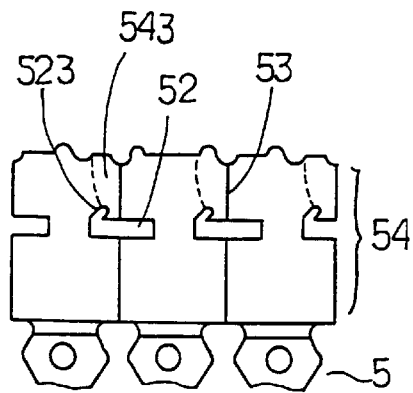
FIG. 17 is a front plan view of a nail base tube of the expanding sleeve anchor structure in accordance with a further embodiment of the present invention.

Referring now to FIG. 17, in accordance with a further embodiment of the present invention, the hollow slot 52 has a left end provided with a notch 523 extending upward in an inclined manner so that the outward folding region 543 is defined between the notch 523 and the separating line 53.

Figure 18:
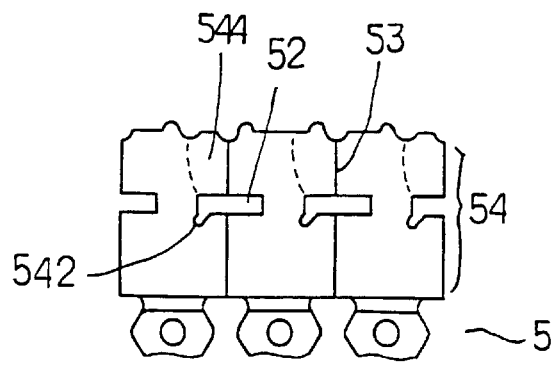
FIG. 18 is a front plan view of a nail base tube of the expanding sleeve anchor structure in accordance with a further embodiment of the present invention.

Referring now to FIG. 18, in accordance with a further embodiment of the present invention, the hollow slot 52 has a left end provided with a notch 542 extending downward so that an outward folding region 544 is defined between the notch 542 and the separating line 53.

Figure 19:
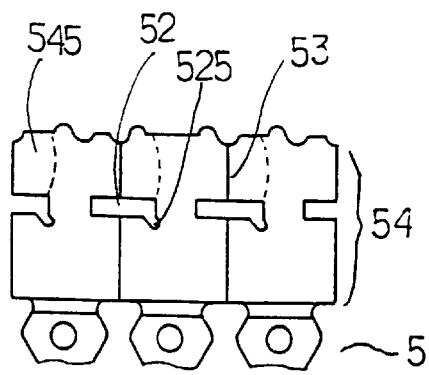
FIG. 19 is a front plan view of a nail base tube of the expanding sleeve anchor structure in accordance with a further embodiment of the present invention.

Referring now to FIG. 19, in accordance with a further embodiment of the present invention, the hollow slot 52 has a right end provided with a notch 525 extending downward so that an outward folding region 545 is defined between the notch 525 and the separating line 53.

Figure 20:
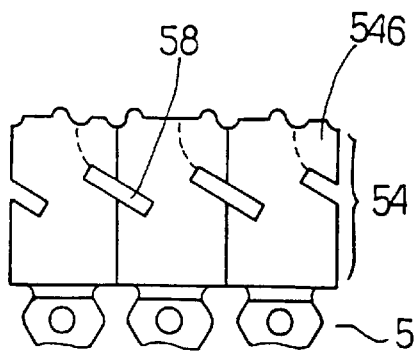
FIG. 20 is a front plan view of a nail base tube of the expanding sleeve anchor structure in accordance with a further embodiment of the present invention.

Referring now to FIG. 20, in accordance with a further embodiment of the present invention, the hollow slot 58 is arranged in an oblique manner, thereby forming an outward folding region 546.

Referring to FIGS. 21 and 22, the front end guide inlet 32 of the conventional nail base tube 3 as shown in FIG. 21 has a large forging face so that the urging nut 22 is not easily drawn into the conventional nail base tube 3 through the front end guide inlet 32. In comparison, the inlet tabs 51 of the nail base tube 5 of the present invention as shown in FIG. 22 can be used for facilitating entrance of the urging nut 72 into the nail base tube 5.

It should be clear to those skilled in the art that firther embodiments may be made without departing from the scope of the present invention.

What is claimed is:

1. An expanding sleeve anchor structure comprising:

an elongated, hollow nail base tube for use with a tapered spreading member;

said nail base tube being divided into an expanding region and a non-expanding region;

said expanding region having one end defined by an end of said nail base tube and at an opposing end terminating at a portion of said nail base tube having at least one recessed rib;

said expanding region being provided with a plurality of longitudinal separating lines;

each of said separating lines provided with an elongated transverse hollow slot substantially centrally located thereon.

2. The expanding sleeve anchor structure as recited in claim 1, wherein said hollow slot is provided at one end with a substantially longitudinally directed notch defining an outwardly folding region between said notch and said separating line.

3. The expanding sleeve anchor structure as recited in claim 1, wherein said end of the expanding region corresponding to said one end of said nail base tube is provided with at least two equally spaced, longitudinally extending, inlet tabs.

* * * * *